May 17, 1932.  G. C. MONCKMEIER  1,859,045
WEAR COMPENSATING BOLT
Filed July 16, 1927
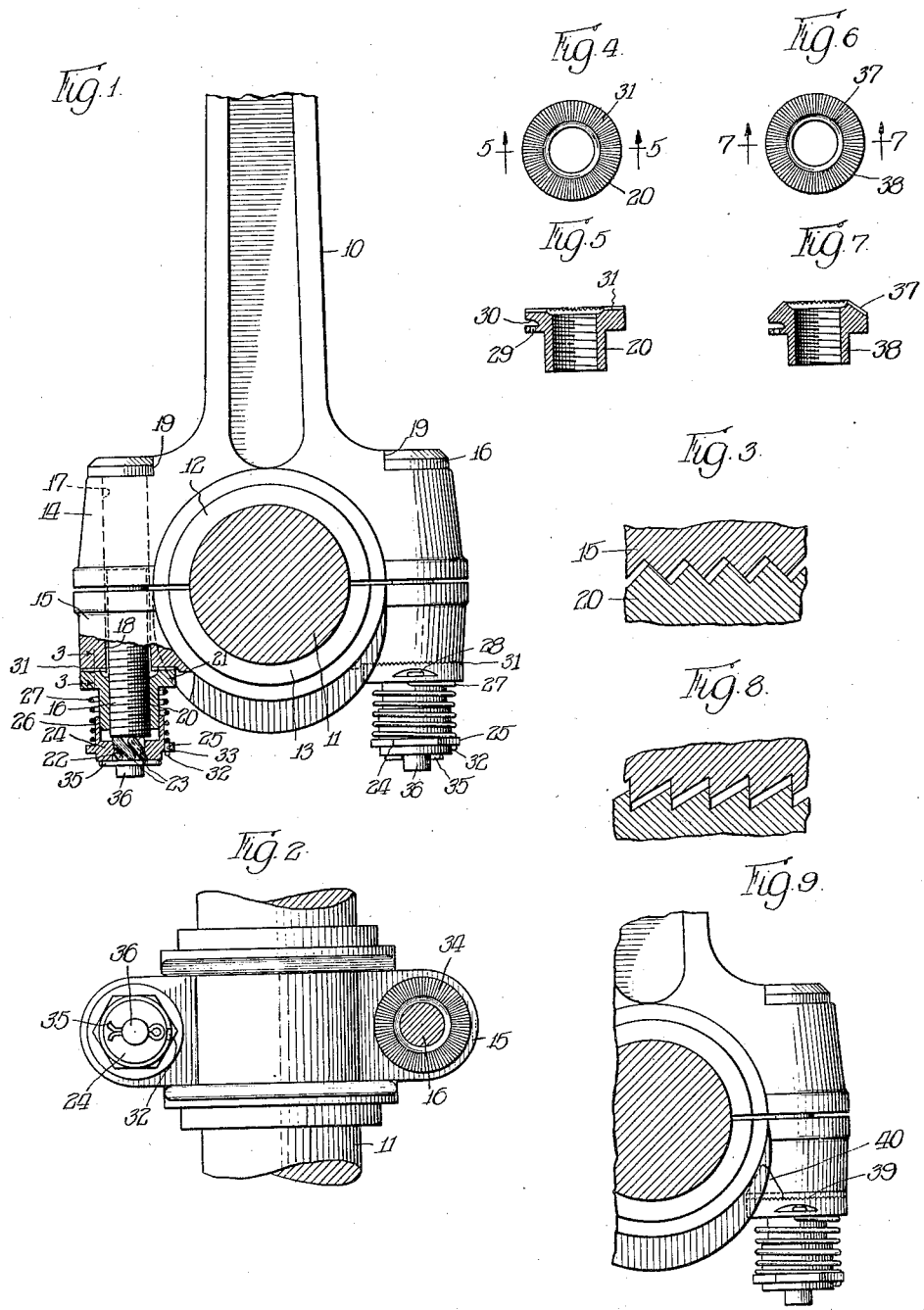
Inventor:
Gustav C. Monckmeier,
By Cromwell, Griest & Warden
attys.
Witness:
P. Burkhardt Patented May 17, 1932

1,859,045

UNITED STATES PATENT OFFICE

GUSTAV C. MONCKMEIER, OF CHICAGO, ILLINOIS

WEAR COMPENSATING BOLT

Application filed July 16, 1927. Serial No. 206,166.

The present invention has to do with wear compensating bolts of the type in which a nut is automatically advanced along a bolt by a spring as wear occurs between the parts held together by the bolt.

The bolt of the invention, while automatically compensating for wear in the manner described, differs from other bolts of the same general type in that, instead of clamping the parts together under pressure, it leaves a slight amount of clearance between the parts at all times, which clearance, when the bolt is applied for instance to a connecting rod bearing, is not enough to permit knocking, but is sufficient to prevent any binding in the bearing due to expansion or out-of-roundness in the journal of the crankshaft.

From the foregoing, it will be appreciated that a device embodying the invention may be used advantageously in many different places where wear occurs, as in connecting rod bearings, in main bearings, in spring shackles, in axle bearings, in differential pinion mountings, and in other like places.

One form of the invention, together with certain slight modifications thereof, is presented herein for the purpose of exemplification, but it will of course be understood that the invention is susceptible of embodiment in other structurally quite different forms coming equally within the scope of the appended claims.

In the drawings:

Fig. 1 is a fragmentary side view of a connecting rod equipped with the bolts of the invention;

Fig. 2 is an end view of the connecting rod;

Fig. 3 is a greatly magnified section, taken on the line 3—3 of Fig. 1;

Fig. 4 is an end view of the nut;

Fig. 5 is a section taken on the line 5—5 of Fig. 4;

Fig. 6 is an end view of a slightly modified nut;

Fig. 7 is a section taken on the line 7—7 of Fig. 6;

Fig. 8 is a greatly magnified section, corresponding to Fig. 3, showing modified serrations in the nut and bearing cap;

Fig. 9 is a fragmentary side view, corresponding to a portion of Fig. 1 but showing a serrated plate positioned between the nut and the bearing cap.

The bolt is shown in the drawings as applied to the crankshaft bearing of a connecting rod 10. The crankshaft 11 is journaled between two semi-cylindrical bearings 12 and 13 which are held in position about the crankshaft at the lower end 14 of the connecting rod by a bearing cap 15 which is detachably secured to the lower end 14 of the rod by means of two automatic wear compensating bolts 16 constructed in accordance with the invention. The bolts are duplicates of each other, and therefore only one of the same will be described.

The bolt 16 extends through two aligned apertures 17 and 18 in the parts 14 and 15 of the bearing, and is prevented from turning therein by a flat side 19 on the otherwise round head of the bolt, which side seats contiguously against a flat shoulder formed in the part 14. The shank of the bolt is threaded near the lower end thereof, and a nut 20 is mounted on the threaded portion. The nut is of cylindrical form, and is provided at its front end with a radial flange 21. The shank of the bolt is provided beyond the threaded portion with a portion 22 of non-circular generally star-like cross section, which is produced by the formation thereon of a plurality of ribs 23, preferably about six in number, which extend diagonally in the direction shown. A washer 24 having a central bore of substantially the same shape as the portion 22 of the shank of the bolt, is seated on the portion 22, and is provided, inwardly of the hexagonal or otherwise shaped periphery 25 thereof, with a sleeve 26 which telescopes over the lower end of the nut.

A coil spring 27 encircles the nut and the washer between the flanges 21 and 25 thereof, and is secured at its opposite ends to such flanges, one end 28 of the spring being hooked through an aperture 29 in the flange 21 and into a slot 30 which is cut into the periphery of the flange 21 at a point spaced from the front face 31 of the nut, and the other end 32 of the spring being hooked through an aperture 33 in the flange 25 of the washer.

The front face 31 of the nut is serrated, as shown in Fig. 4, and the area 34 of the bearing cap 15 against which the front face of the nut bears is correspondingly serrated, as shown in Fig. 2. The serrations may consist of radially extending ribs, or any other kind of formations producing roughness.

When it is desired to place the spring 27 under tension in order to cause the nut 20 to advance automatically along the bolt as wear occurs between the parts held together by the same, the washer 24 seated on the portion 22 of the shank of the bolt is turned by hand in a clockwise direction to wind up the spring, the shaping of the cooperating portions of the washer and bolt constituting a ratchet-like connection between such elements which serves to lock the washer, when released, in any desired position of adjustment to which it is turned in tensioning the spring. After the washer has been released, a cotter pin 35 is inserted through an aperture in the circular tip 36 on the shank of the bolt beyond the portion 22.

Because of the engagement of the serrations on the nut with those on the bearing cap, the nut cannot be screwed up far enough on the bolt, either with the spring or by hand, to bring any pressure to bear on the bearing cap in a direction axially of the nut, with the result that the nut and the bearing cap will always have a very small amount of clearance therebetween, as shown in Fig. 3. While the spring 27 always tends to turn the nut up on the bolt, the engagement of the serrations in the nut with those in the bearing cap will only permit the nut to be turned by the spring when the bearing cap has receded far enough away from the nut, through wear or other cause, to allow the high points of the serrations in the nut to ride over those in the bearing cap, at which time the nut will be turned by the spring a very small distance. The normal association between the nut and the bearing cap is one wherein a clearance ranging from about .002 to .008 inch is present. The operating clearance is determined by the height of the serrations and by the distance between the same. Any predetermined amount of operating clearance may be had by suitable variations in these factors. The clearance may of course be made much smaller or larger than the normal range of amounts above indicated.

If the serrations in the nut and the bearing cap are of the cross-sectional shape shown in Fig. 3, those in the nut will serve to yieldingly resist any movement of the cap toward the nut, since a cam-like engagement is had between the serrations, and, in order for the cap to back up toward the nut, it is necessary for the serrations in the cap to wedge the serrations in the nut laterally against the yielding resistance of the tensioned spring 27.

In Figs. 6 and 7 is shown a slightly different shaping of the face 37 of the nut 38. The face 37, instead of being flat, is made conical for coaction with a conical counterbore in the bearing cap, which special shaping serves to maintain the nut and the cap in centered relation, and is of particular value in connection with those caps which are designed for use with conical face nuts.

In Fig. 8 the serrations on the nut and the bearing cap are ratchet-shaped in cross section, thereby eliminating any spring resistance to the backing up of the cap and permitting free play of the cap toward and away from the nut.

The serrations on the face of the bearing cap corresponding with those on the face of the nut may be formed on the cap before it is assembled with the nut, or may be worn into the cap by the serrations in the nut acting as a shaping die when the bearing assembly is first used with the nut of the invention applied to the same, which method of serrating the cap is possible because of the softness of the metal from which such caps are ordinarily made.

In Fig. 9 a thin plate 39 is shown between the bearing cap and the nut. The plate 39 is serrated on one face for coaction with the nut, and is provided with suitable means, such as upturned ears 40, for preventing the plate from turning on the cap.

I claim:

1. In a device of the type described, a bolt, a nut which is mounted in such a way as to advance along the bolt against a member when turned, a spring for turning the nut, and serrations in the front face of the nut adapted to clutch with corresponding serrations in the face of the member against which the nut is advanced whereby to prevent the nut from being turned by the spring except when a slight amount of clearance is present between the nut and such member.

2. In a device of the type described, a bolt, a nut which is mounted in such a way as to advance along the bolt against a member when turned, a spring for turning the nut, and radially extending ribs on the front face of the nut adapted to clutch with corresponding serrations in the face of the member against which the nut is advanced whereby to prevent the nut from being turned by the spring except when a slight amount of clearance is present between the nut and such member.

3. In a device of the type described, a bolt, a nut which is mounted in such a way as to advance along the bolt against a member when turned, a spring for turning the nut, and radially extending ratchet-like ribs on the front face of the nut adapted to clutch with corresponding ribs on the face of the member against which the nut is advanced whereby to prevent the nut from being turned by the spring except when a slight amount of clearance is present between the nut and such member.

4. In a device of the type described, a bolt, a nut which is mounted in such a way as to advance along the bolt against a member when turned, a spring for turning the nut, and means to prevent the nut from being turned by the spring, said means being self-releasing when the clearance between the nut and the member against which the nut is advanced exceeds a predetermined amount.

5. In a device of the type described, a bolt, a nut which is mounted in such a way as to advance along the bolt when turned, and a spring for turning the nut, said nut having a front face which is roughened in order to clutch with the surface against which the nut is placed and prevent the spring from turning the nut until after a certain amount of clearance has developed between the nut and such surface.

In testimony whereof I have hereunto subscribed my name.

GUSTAV C. MONCKMEIER.